United States Patent
Birner-Such et al.

(10) Patent No.: US 9,120,174 B2
(45) Date of Patent: Sep. 1, 2015

(54) WELDING ROBOT

(71) Applicant: KUKA Roboter GmbH, Augsburg (DE)

(72) Inventors: Tanja Birner-Such, Augsburg (DE); Simon Dietrich, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 249 days.

(21) Appl. No.: 13/707,936

(22) Filed: Dec. 7, 2012

(65) Prior Publication Data

US 2013/0146574 A1 Jun. 13, 2013

(30) Foreign Application Priority Data

Dec. 8, 2011 (DE) .......... 10 2011 087 958

(51) Int. Cl.
B23K 11/16 (2006.01)
B23K 11/10 (2006.01)
B23K 9/28 (2006.01)
B23K 11/11 (2006.01)
B23K 11/24 (2006.01)

(52) U.S. Cl.
CPC ............. B23K 9/28 (2013.01); B23K 11/115 (2013.01); B23K 11/241 (2013.01); Y10S 901/02 (2013.01); Y10S 901/42 (2013.01)

(58) Field of Classification Search
CPC ........ B23K 11/06; B23K 11/10; B23K 11/16; B23K 11/30; B23K 9/28; B23K 9/10; B23K 9/18; B23K 9/32
USPC .......... 219/82, 84, 86.1, 86.25, 91.9, 99, 117, 219/118, 119, 86.51, 109, 86.41, 120, 110, 219/78.01; 700/245
See application file for complete search history.

(56) References Cited

U.S. PATENT DOCUMENTS

| 4,442,337 | A |   | 4/1984 | Nakata et al. |
| 4,447,700 | A | * | 5/1984 | Cohen ......................... 219/117.1 |
| 4,973,813 | A | * | 11/1990 | Mitchell ........................ 219/109 |
| 5,111,020 | A | * | 5/1992 | Stiebel .......................... 219/110 |
| 5,140,126 | A | * | 8/1992 | Ishibashi ....................... 219/110 |

(Continued)

FOREIGN PATENT DOCUMENTS

| CN | 1383952 A | 12/2002 |
| CN | 101890715 A | 11/2010 |

(Continued)

OTHER PUBLICATIONS

German Patent Office; Search Report in German Patent Application No. 10 2011 087 958.7 dated Jul. 25, 2012; 5 pages.

(Continued)

*Primary Examiner* — Dana Ross
*Assistant Examiner* — Michael Laflame, Jr.
(74) *Attorney, Agent, or Firm* — Wood, Herron & Evans, LLP

(57) ABSTRACT

The invention relates to a welding robot for resistance welding, which exhibits a welding tongs (21), a welding current generator (1) connected to the welding electrodes (24, 25) of the welding tongs (21), for supplying the welding electrodes (24, 25) with electric energy during the resistance welding, and an industrial robot. The industrial robot comprises a robot arm (2) and a robot control device (9) for moving the robot arm (2). The welding tongs (21) is connected to the robot arm (2) and the robot control device (9) is connected to the welding current generator (1) and a tongs drive (26, 27) of the welding tongs (21).

14 Claims, 2 Drawing Sheets

(56) References Cited

U.S. PATENT DOCUMENTS

| | | | |
|---|---|---|---|
| 5,151,570 A * | 9/1992 | Sakurai | 219/86.25 |
| 5,254,828 A * | 10/1993 | Stiebel | 219/110 |
| 5,742,022 A * | 4/1998 | Crawford et al. | 219/86.25 |
| 5,906,755 A * | 5/1999 | Arasuna et al. | 219/86.41 |
| 5,988,486 A * | 11/1999 | Kobayashi et al. | 228/212 |
| 6,004,019 A | 12/1999 | Suita et al. | |
| 6,011,237 A * | 1/2000 | Yang | 219/119 |
| 6,337,456 B1 * | 1/2002 | Taniguchi et al. | 219/86.25 |
| 6,545,244 B1 * | 4/2003 | Gould et al. | 219/118 |
| 6,907,318 B2 * | 6/2005 | Passmore et al. | 700/245 |
| 7,127,438 B2 * | 10/2006 | Monari | 706/21 |
| 7,655,880 B2 * | 2/2010 | Auger et al. | 219/110 |
| 7,738,996 B2 * | 6/2010 | Luthardt | 700/245 |
| 2003/0132201 A1 | 7/2003 | Kaeseler et al. | |
| 2005/0082340 A1 | 4/2005 | Wiedemann et al. | |
| 2009/0302009 A1 * | 12/2009 | Sigler et al. | 219/117.1 |
| 2010/0270271 A1 * | 10/2010 | Jacob et al. | 219/86.25 |
| 2010/0326965 A1 * | 12/2010 | Hasegawa et al. | 219/117.1 |

FOREIGN PATENT DOCUMENTS

| | | |
|---|---|---|
| DE | 3115840 A1 | 1/1982 |
| DE | 3804919 C2 | 11/1989 |
| DE | 10005963 C2 | 4/2003 |
| DE | 69720859 T2 | 12/2003 |
| EP | 1364738 B1 | 7/2006 |
| EP | 1252963 B1 | 11/2006 |
| EP | 1508396 B1 | 1/2007 |
| WO | 0073011 A1 | 12/2000 |

OTHER PUBLICATIONS

Chinese Patent Office; Office Action in Chinese Patent Application No. 201210427359.8 dated Aug. 4, 2014; 16 pages.

Chinese Patent Office; Search Report in Chinese Patent Application No. 2012104273598 dated Jul. 27, 2014; 2 pages.

* cited by examiner

WELDING ROBOT

TECHNICAL FIELD

The invention relates to a welding robot.

BACKGROUND

DE 31 15 840 A1 discloses that with resistance welding, wherein, during the welding, the electric resistance between two welding electrodes is automatically adjusted through a change of the contact force of the electrodes in a reference resistance curve, and in addition, the electric potential at the welding electrodes is adjusted to a reference potential curve.

EP 1 508 396 B1 discloses a welding robot, comprising an industrial robot and a welding tongs, which is attached to the robot arm of the industrial robot. The welding tongs, which can be moved by means of the robot arm, comprises two electrode arms, an electric motor for moving the electrode arms, and force sensors for determining the contact force applied by the electrode arm. The welding device further comprises a regulating device, which is configured, due to the deviation of the actual contact force from the target contact force, to generate a correction variable for the motor position of the electric motor.

SUMMARY

The objective of the invention is to provide an improved welding robot.

The objective of the invention is attained by means of a welding robot for resistance welding, having
  a welding tongs, exhibiting a tongs drive and two welding electrodes, which can be pressed against one another by means of the tongs drive, which press against at least two objects that are to be welded by means of resistance welding during the intended use of the welding robot,
  a welding current generator, connected to the welding electrodes, for supplying the welding electrodes with electric energy during the resistance welding, and
  an industrial robot, exhibiting a robot arm and a robot control device for moving the robot arm, wherein the robot arm exhibits numerous limbs disposed successively, and drives connected to the robot control device, the welding tongs being connected to the robot arm, the robot control device being connected to the welding current generator and the tongs drive, and a computer program that runs on the robot control device, which controls the drive for the movement of the robot arm, the tongs drive being controlled in a regulated manner such that during the resistance welding, a predetermined electric target welding resistance is applied to the welding electrodes, and controls the welding current generator in such a manner that said welding current generator supplies the welding electrodes with a predetermined electric energy.

The welding robot according to the invention thus comprises the welding tongs, the welding electrodes of which are supplied with electric energy during the welding process by means of the welding generator, as is known, in theory, to a person skilled in the art, for resistance spot welding. The welding generator comprises, for example, a welding converter, in particular a medium frequency converter, a welding transformer, and a welding rectifier, as is known, in theory, to a person skilled in the art. The welding generator is preferably configured to generate an adjustable, pulsed electric potential for the welding electrodes, so that a predetermined electric current flows through the welding electrodes during the resistance welding. The resistance welding is, in particular, a resistance spot welding, but can, for example, also be a resistance seam welding.

The welding robot according to the invention further comprises the industrial robot, on the robot arm of which the welding tongs is attached. In accordance with the invention, a computer program runs on the robot control device of the industrial robot, which controls, or if applicable, regulates, not only the movement of the drive for the robot arm, but also implements a regulation of the force, with which the welding electrodes are pressed against the object that is to be welded, by means of the tongs drive. The tongs drive is preferably an electric tongs drive. In accordance with the invention, the electric welding resistance, i.e. the electric resistance of the objects which are to be welded, depending on the force with which the, at least two, objects are pressed together by means of the welding tongs during the welding process, is used as the reference value for said regulation. Moreover, the computer program is designed according to the invention such that it controls the welding current generator in such a manner that said generator supplies the welding electrodes with a desired electric energy. This can be realized, for example, in such a manner, in which the welding robot according to the invention is configured such, that the computer program running on the robot control device is designed such that it transmits data regarding an electric target current for the welding electrodes during the resistance welding process, and the welding current generator is configured, in particular, to generate an electric supply voltage for the welding electrodes in such a manner that the electric target current flows, at least in the middle, through the welding electrodes.

In this manner, the robot control device, or the computer program running thereon, is executed such that the complete control, or regulation, respectively, of the welding process is realized by means of a single control unit, specifically the control unit provided for the movement of the robot arm. As a result, it is, in particular, possible to better synchronize the movement of the robot arm, the welding current generator, and the welding tongs, than when the control or regulation of the welding tongs were to be carried out by means of separate welding control unit. Furthermore, the force, by means of which the welding electrodes are to be pressed against one another during the welding process, is not used as the reference value for the regulation of the welding tongs, but instead, the welding resistance is used. In this manner, relatively expensive force or strain gauges for determining the current force exerted by the welding tongs are no longer needed. The current welding resistance, by contrast, can be determined in a simple manner, by means of the welding current generator, because the current electric current flowing through the welding electrodes and the electric potential applied to the welding electrodes is known.

According to a preferred embodiment of the welding robot according to the invention, the computer program running on the robot control device comprises a first bidirectional interface to the welding current generator, for a bidirectional communication with the welding current generator. The first bidirectional interface is designed, in particular, such that it enables a communication in real-time, preferably in hard real-time. In this manner, it is possible for the robot control device, or the computer program, respectively, to receive information regarding the current welding resistance. As a result, it is possible for the robot control device, or the computer program, respectively, to control the tongs drive of the welding tongs in such a manner that the desired guidance behavior, i.e. the regulation of the welding tongs using the welding resistance as the reference value, can be realized.

According to another variation of the welding robot according to the invention, the computer program running on the robot control device is configured to control the tongs drive in a regulated manner, based on a reference curve of a target welding resistance. The reference curve of the target welding resistance can be automatically generated for example. As a result, the robot control device regulates the temporal course of the welding resistance during the welding process based on the reference curve, through controlling the tongs drive. As a result, the quality of the welding can be improved.

For an improved regulation of the welding tongs based on the welding resistance, the computer program running on the robot control device can also be designed in such a manner that the robot control device also controls the tongs drive in a regulated manner, according to a target value profile of the force that is to be applied by the electrodes (24, 25).

According to another embodiment of the welding robot according to the invention, the drives for the robot arm are designed as regulated electric drives. The robot control device, or the computer program, respectively, is then, preferably, designed such that it transmits target values for their movements to the regulated electric drives by means of the computer program.

According to a preferred embodiment of the welding robot according to the invention, the computer program features a first computer program and a second computer program. The first computer program is provided to control the drives of the robot arm and, in particular, the tongs drive. The second computer program is provided to control the welding current generator such that said generator supplies the welding electrodes with the predetermined electric energy and generates target values for the control of the tongs drive, such that during the resistance welding, the predetermined electric target welding resistance is applied to the welding electrodes. The computer program running on the robot control device is thus designed such that it comprises a movement control for the robot aim and the tongs drive in the form of the first computer program, and a welding control in the form of the second computer program. As a result, for example, an already existing robot control device, which only comprises a movement control of the robot arm, can be expanded, in a relatively simple manner, with the second computer program, such that the entire control, or regulation, respectively, of the welding robot is carried out be means of the robot control device. Preferably, the second computer program comprises the, if applicable, existing first bidirectional interface to the welding current generator.

The second computer program can exhibit a second bidirectional interface for communicating with the first computer program. The second bidirectional interface is designed, in particular, in such a manner that it enables communication in real-time, preferably in hard real-time.

In accordance with a variation of the welding robot according to the invention, the robot control device can be configured to communicate with the welding generator in real-time by means of the second computer program, in particular via a fast field bus in a bidirectional manner. As a result, a relatively fast communication between the robot control device and the welding current generator is enabled.

The robot control device can also be configured to control the welding current generator and the tongs drive at the same tune by means of the second computer program, and/or at the same time, to control the tongs drive and the drives for the robot arm.

The second computer program can receive data from the first computer program for closing the welding tongs, and to control the welding current generator in relation to said closing movement. The second computer program can tell the first computer program to control the tongs drive in order to open the welding tongs. The second computer program can receive data from the first computer program for rotating the welding tongs about a welding spot, and to control the welding current generator in relation to said turning. The second computer program can also exchange data with a calibration station for welding tongs in a bidirectional manner, in particular in real-time. Furthermore, an automatic calibration of electric and mechanical parameters of the welding tongs may be provided.

By means of the welding robot according to the invention, one obtains, accordingly, a regulation procedure for resistance welding. The technological process for resistance welding is carried out, in particular, by means of the controlled interaction of the following technological variables:

welding energy
electrode force
supplementary movements

The quality of the technological process, and therefore the quality of the welding spot, is dependent, in particular, on the quality of the control, respectively, of the technological variables. The welding quality becomes increasingly better as the technological variables become more precisely and more synchronously regulated.

The welding energy is made available to the welding tongs preferably in the form of a regulated welding current, generated by the welding current generator. In particular, said current is generated by a medium frequency welding converter in connection with a combination welding transformer and welding rectifier of the welding current generator.

The electrode force, i.e. the force with which the welding electrodes are pressed together, is obtained by means of the tongs drive for the welding tongs. Tongs drives can function, for example, pneumatically, servo-pneumatically, or by means of an electric motor. Preferably, a welding tongs driven by an electric motor is used. With resistance welding, in particular with resistance spot welding, using the welding robot according to the invention, the tongs drive in the robot control device is designed preferably as an additional axis of the robot arm (e.g. the $7^{th}$ axis). The regulation of the electrode force also occurs in the robot control device by means of software, or a computer program.

Additional movements of the welding tongs during resistance spot welding or resistance welding, respectively, can be opening/closing movements, compensation movement (tongs adjustment), and rotational movements.

The opening/closing movements of the welding tongs are, if applicable, also implemented by the tongs drive and are preferably coordinated to the movement of the welding tongs in relation to the workpiece. Particularly with resistance spot welding by means of a welding robot, it is advantageous to overlap the closing movement of the welding tongs at least in part with the movement toward the welding spot, and, on the other hand, to overlap the opening movement of the welding tongs at least in part with the movement away from the welding spot. A hold-back time is obtained by the delay of the starting of the welding current after closing the welding tongs, and the build-up of the electrode force, wherein a follow-through time is obtained after the stopping of the welding current through the delay in opening the welding tongs. The hold-back and follow-through times are welding parameters, which may affect the welding quality. In an advantageous variation of the welding robot according to the invention, the control of the opening/closing movements of the welding tongs is coordinated with the control of the welding current.

The compensation movement of the welding tongs should ensure the adjustment of the welding tongs to the workpiece for changing conditions such as the position of the workpiece, wear to the electrode caps, bowing of the tongs aims. Due to the bowing of the tongs arm, depending on the current electrode force, it is advantageous to closely link the control of the compensation movement to the control/regulation of the electrode force.

The rotational movement of the welding tongs represents a rotation of the welding tongs about the axis of the welding spot, at the same time that the welding is being carried out. If applicable, this existing movement is controlled by the robot control device, in accordance with a variation of the welding robot according to the invention.

Depending on the embodiment of the welding robot according to the invention, this can implement the following functions:
- opening/closing of the welding tongs in synchronization with the movement of the robot arm,
- electrode force controlled/regulated via the additional axis of the robot control,
- tongs correction synchronized to the electrode force,
- welding current synchronized to the electrode force,
- welding current synchronized to the rotational movement.

BRIEF DESCRIPTION OF THE DRAWINGS

An embodiment example of the invention is depicted in an exemplary manner in the attached schematic drawings. They show.

DETAILED DESCRIPTION

Figure 1:
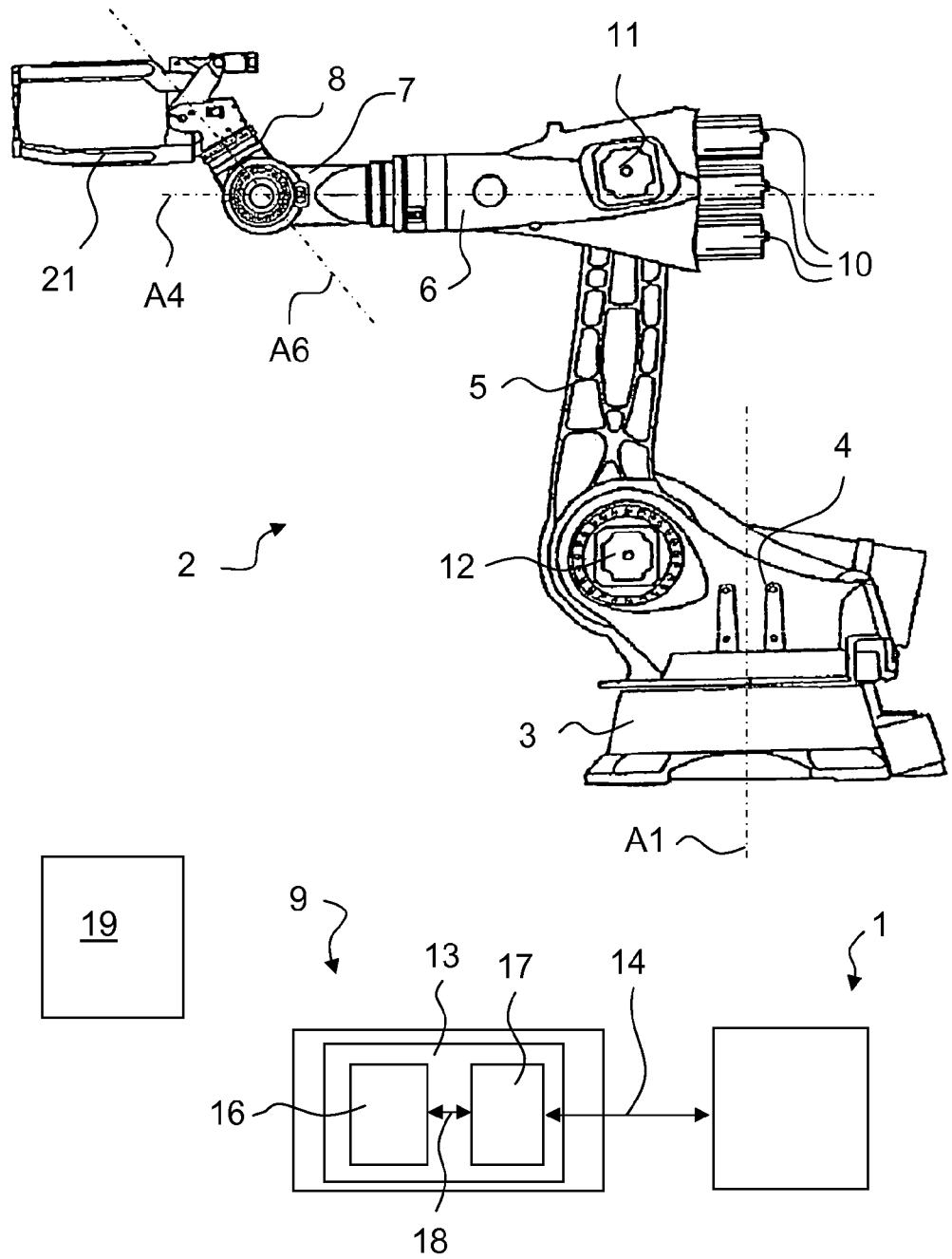
FIG. 1 a welding robot exhibiting an industrial robot and a welding tongs attached to the robot arm of the industrial robot, and FIG. 2 the welding tongs.
Figure 2:
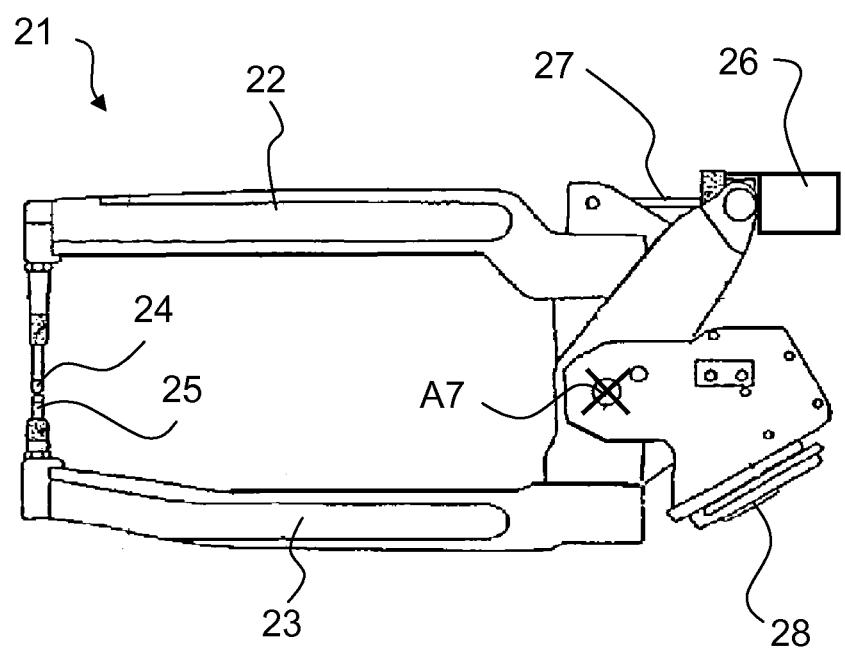

FIG. 1 shows a welding robot, provided, in particular, for resistance welding, preferably for resistance spot welding. The welding robot exhibits an industrial robot, a welding tongs 21 shown in greater detail in FIG. 2, and a welding current generator 1. The industrial robot comprises a robot arm 2 and a robot control device 9 for moving the robot arm 2. The welding tongs 21 is attached to an attachment device 8 of the robot arm 2, attached thereto, and can, therefore, be moved by means of the robot arm 2.

In the case of the present embodiment example, the robot arm 2 comprises numerous limbs, successively disposed and joined by means of joints. The limbs comprise, in particular, a stationary or moving frame 3 and a carousel 4 supported such that it can rotate in relation to the frame 3 about a vertical axis A1. Further limbs of the robot arm 2 in the case of the present embodiment example, are a rocker arm 5, a cantilever 6 and a robot hand 7, preferably having numerous axes, having the attachment device 8 for attaching the welding tongs 21, designed, for example, as a flange. The rocker arm 5 is supported at the lower end, for example, on a rocker bearing head, not shown in greater detail, on the carousel 4, such that it can pivot about a preferably horizontal axis. The cantilever 6 is supported in turn at the upper end of the rocker arm 5 such that it can pivot about a likewise preferably horizontal axis. The robot hand 7, having its preferably three axes, of which axes A4 and A6 are shown in FIG. 1, is attached to the end of this cantilever.

In order to move the robot arm 2, said robot arm comprises drives connected to the robot control device 9, which are, in particular, electric drives, in the case of the present embodiment example, regulated electric drives. Only some of the electric motors 10-12 of these electric drives are shown in FIG. 1. A computer program 13 runs on the robot control device 9 by means of which the robot control device 9 controls said drives when the industrial robot is in operation, in such a manner that the attachment device 8 or a so-called tool center point, executes a predetermined movement. If applicable, the robot control device 9 regulates the drives, as is known, in theory, to a person skilled in the art.

In the case of the present embodiment example, the welding tongs 21 exhibits, as is known, in theory, to a person skilled in the art, two electrode arms 22, 23, on each end of which a welding electrode 24, 25, respectively, is disposed. The two electrode arms 22, 23 can be rotated in relation to one another about an axis A7, which is oriented perpendicularly to the drawing plane of FIG. 2, by means of a tongs drive. As a result, it is possible to press the two electrodes 24, 25 against at least two objects that are to be welded together by means of resistance spot welding. In the case of the present embodiment example, the tongs drive comprises an electric motor 26 and a spindle 27 connected to one of the electrode arms 22, which is driven by the electric motor 26 for rotating the two electrode arms 22, 23 in relation to the axis A7. The welding tongs 21 further comprise an attachment device 28, by means of which the welding tongs 21 is attached to the attachment device 8 of the robot arm 2.

In the case of the present embodiment, the computer program comprises a first computer program 16 and a second computer program 17. The first computer program 16 is provided for controlling the drives of the robot arm 2 and the electric motor 26 of the tongs drive. If the drives for the robot arm are regulated electric drives, then the robot control device 9 is designed such that it transmits target values for their movement to the regulated electric drives by means of the computer program 13, or the first computer program 16, respectively.

The second computer program 17 is provided in the case of the present embodiment example, for controlling the welding current generator 1 in such a manner that said generator supplies the welding electrodes 24, 25 with a predetermined electric energy. The welding current generator 1 comprises, e.g. a medium frequency welding converter, a welding transformer, and a welding rectifier, as is known, in theory, to the person skilled in the art. The welding current generator 1 is configured, in the case of the present embodiment example, to generate an adjustable, pulsed electric potential, in order that a predetermined electric current flows through the welding electrodes 24, 25 during the resistance spot welding. The robot control device 9 transmits data regarding said predetermined electric current by means of the second computer program 16 to the welding current generator 1 during the process of the resistance spot welding. For the communication, the second computer program 17 comprises a first bidirectional interface 14 to the welding current generator 1 for example. The welding current generator 1 transmits data via the first bidirectional interface 14, in particular in real-time, preferably in hard real-time, regarding the current welding resistance, which is present at the welding electrodes 24, 25 as a result of the welding current and the electric potential generated by the welding current generator 1.

The second computer program 17 can communicate with the first program 16, via a second bidirectional interface 18 to the first computer program 16, in real-time preferably in hard real-time.

The computer program 13 running on the robot control device 9 is therefore designed such that it comprises a movement control of the robot arm 2 and the electric motor 26 of the tongs drive, in particular in the form of the first computer program 16, and a welding control in the form of the second computer program 17.

In the case of the present embodiment example, the computer program 13 is not only designed such that the robot control device 9 controls the movement of the drives of the robot arm 2, but also regulates the electric welding resistance, i.e. the electric resistance of the objects to be welded with respect to the force with which the welding electrodes 24, 25 are pressed against the objects to be welded by means of the electric motor 26 of the welding drive. For this regulation, the electric welding resistance, i.e. the electric resistance of the objects to be welded with respect to the force with which the, at least two, objects to be welded are pressed together by the welding tongs 21 during the welding process, is used as a reference value. This regulation is implemented in the case of the present embodiment example by means of the second computer program 17, which transmits corresponding data for controlling the electric motor 26 of the tongs drive to the first computer program 16, in particular in real-time, preferably in hard real-time.

Thus, the second computer program 17 implements the following regulation, wherein Pos is the position or location, respectively, of the electric motor 26 of the tongs drive, $R_{Ist}$ is the actual value of the welding resistance, and $R_{Soll}$ is the target value of the welding resistance, ΔPos is a change in the signal assigned to the position of the electric motor 26 of the tongs drive:

$$\text{Pos} = f(R_{Ist})$$

$$\Delta\text{Pos} = f(R_{Ist} - R_{Soll})$$

Thus, the robot control device 9, or respectively, the computer program 13 running thereon is designed such that the complete control, or regulation, respectively, of the welding process is realized by means of a single control unit, specifically the control unit provided for the movement of the robot arm 2. As a result, it is possible to better obtain a synchronization of the movement of the robot arm 2, the welding current generator 1, the welding tongs 21, and the tongs drive.

In the case of the present embodiment example, the computer program 13 running on the robot control device 9 is configured to control, in a regulated manner, the electric motor 26 of the tongs drive based on a reference curve of a target welding resistance. The reference curve of the target welding resistance can preferably be automatically generated. As a result, the robot control device 9 regulates the temporal course of the welding resistance during the welding process based on the reference curve by controlling the electric motor 26 of the tongs drive.

The computer program 13 running on the robot control device 9, in particular the second computer program 17, can, additionally, also be designed such that the robot control device 9 controls the tongs drive 21 according to a target value profile of the force to be applied by the electrodes 24, 25, in a regulated manner.

The second computer program 17 can also receive data from the first computer program 16 for closing the welding tongs 21 and for controlling the welding current generator 1 in relation to said movement. The second computer program 17 can tell the first computer program 16 to control the electric motor 26 of the tongs drive for an opening of the welding tongs 21. The second computer program 17 can receive data from the first computer program 16 for rotating the welding tongs 21 about a welding spot, and for controlling the welding current generator 21 in relation to said rotation. The second computer program 17 can also exchange data in a bidirectional manner with a calibration station 19 for welding tongs, in particular in real-time. Furthermore, an automatic calibration of electrical and mechanical parameters of the welding tongs 21 may be provided.

What is claimed is:

1. A welding robot for resistance welding, comprising a welding tongs including a tongs drive and two welding electrodes adapted to be pressed against one another by the tongs drive such that during operation of the welding robot, the welding electrodes press against at least two objects that are to be welded together by resistance welding,
    a welding current generator connected to the welding electrodes for supplying the welding electrodes with electric energy during the resistance welding,
    an industrial robot including a robot arm and a robot control device for moving the robot arm, wherein the robot arm includes successively disposed links and drives connected to the robot control device,
    wherein the welding tongs is attached to the robot arm,
    wherein the robot control device is connected to the welding current generator and the tongs drive, and
    a computer program running on the robot control device, whereby the control device controls the drives of the robot arm for its movement, controls the tongs drive in a regulated manner such that during the resistance welding the force applied to the objects is controlled and a predetermined electric target welding resistance is applied to the welding electrodes, and controls the welding current generator in such a manner that said generator supplies the welding electrodes with a predetermined electric energy,
    wherein the computer program includes a first bidirectional interface to the welding current generator, by which the robot control device communicates with the welding current generator via the computer program.

2. The welding robot according to claim 1, in which the computer program running on the robot control device is designed such that it transmits data regarding an electric target current for the welding electrodes to the welding current generator during the resistance welding process.

3. The welding robot according to claim 1, in which the welding current generator transmits data to the robot control device regarding the current welding resistance.

4. The welding robot according to claim 1, in which the computer program running on the robot control device controls, in a regulated manner, the tongs drive based on a reference curve of a target welding resistance.

5. The welding robot according to claim 1, in which the computer program running on the robot control device is designed such that the robot control device controls, in a regulated manner, the tongs drive according to a target value profile of the force that is to be applied by the electrodes.

6. The welding robot according to claim 1, in which the drives of the robot arm are designed as regulated electric drives, and the robot control device transmits target values for the movement of said drives to the regulated electric drives by means of the computer program.

7. The welding robot according to claim 1, in which the computer program comprises a first computer program and a second computer program, wherein the first computer program is provided for controlling the drives of the robot arm and the second computer program is provided for controlling the welding current generator in such a manner that said generator supplies the welding electrodes with the predetermined electric energy, and generates target values for controlling the tongs drive, such that during the resistance welding, the predetermined electric target welding resistance is applied to the welding electrodes.

8. The welding robot according to claim 7, in which the second computer program communicates, by means of a second bidirectional interface, with the first computer program, in a bidirectional manner.

9. The welding robot according to claim 7, wherein at least one of:
- the robot control device communicates in real-time, by means of the second computer program, with the welding current generator,
- the robotic control device simultaneously controls the welding current generator and the tongs drive,
- the robotic control device simultaneously controls the tongs drive and the drives of the robot arm,
- the second computer program receives data from the first computer program for closing the welding tongs and controls the welding current generator in relation to this movement,
- the second computer program tells the first computer program to control the tongs drive for an opening of the welding tongs,
- the second computer program receives data from the first computer program for rotating the welding tongs about a welding spot, and controls the welding current generator in relation to said rotation,
- the second computer program exchanges data with a calibration station for welding tongs, in a bidirectional manner or
- an automatic calibration of electrical and mechanical parameters for the welding tongs is provided.

10. The welding robot of claim 2, wherein the welding current generator generates an electric supply voltage for the welding electrodes in such a manner that the electric target current flows, at least in the middle, through the welding electrodes.

11. The welding robot of claim 4, wherein the reference curve of the target welding resistance is automatically generated.

12. The welding robot of claim 7, wherein the first computer program further controls the-tongs drive.

13. The welding robot of claim 9, wherein the robot control device communicates via a fast field bus in a bidirectional manner with the welding current generator.

14. The welding robot of claim 9, in which the second computer program exchanges data with the calibration station for welding tongs in a bidirectional manner, and wherein the data is exchanged in real-time.

* * * * *